United States Patent
Sugaya

(10) Patent No.: US 9,781,757 B2
(45) Date of Patent: Oct. 3, 2017

(54) CONNECTION INFORMATION SHARING SERVER, A METHOD OF SHARING CONNECTION INFORMATION, AND A PROGRAM FOR CONNECTION INFORMATION SHARING SERVER

(71) Applicant: OPTiM Corporation, Saga (JP)

(72) Inventor: Shunji Sugaya, Tokyo (JP)

(73) Assignee: OPTIM CORPORATION, Saga-shi (JP)

( * ) Notice: Subject to any disclaimer, the term of this patent is extended or adjusted under 35 U.S.C. 154(b) by 203 days.

(21) Appl. No.: 14/819,533

(22) Filed: Aug. 6, 2015

(65) Prior Publication Data

US 2017/0041969 A1    Feb. 9, 2017

(51) Int. Cl.
*H04W 4/04*     (2009.01)
*H04W 76/02*    (2009.01)
*H04W 12/06*    (2009.01)

(52) U.S. Cl.
CPC .......... *H04W 76/023* (2013.01); *H04W 4/04* (2013.01); *H04W 12/06* (2013.01)

(58) Field of Classification Search
CPC ...... H04W 12/06; H04W 4/04; H04W 76/023
See application file for complete search history.

(56) References Cited

U.S. PATENT DOCUMENTS

| 2005/0266827 | A1* | 12/2005 | Kim ...................... H04W 84/18 455/411 |
| 2015/0099545 | A1* | 4/2015 | Hyun ...................... H04W 4/02 455/456.3 |

FOREIGN PATENT DOCUMENTS

JP        2013-069245        4/2013

* cited by examiner

*Primary Examiner* — Ayaz Sheikh
*Assistant Examiner* — Debebe Asefa
(74) *Attorney, Agent, or Firm* — Lex IP Meister, PLLC

(57) ABSTRACT

The present invention is to provide with the connection information on adjacent devices capable of connecting from a communication terminal. A connection information sharing server 200, communicatively connected with a communication terminal 10 and provided with a terminal location database 250 storing the location of devices in the storage unit, acquires the location information on the communication terminal 10, extracts adjacent devices 50 within a predefined distance from the terminal location database 250 based on the acquired location information, determines the connection methods available for connecting the communication terminal 10 with the adjacent devices 50, and transmits the determined connection method together with the information on the adjacent devices 50 to the communication terminal 10.

10 Claims, 7 Drawing Sheets

Fig. 1
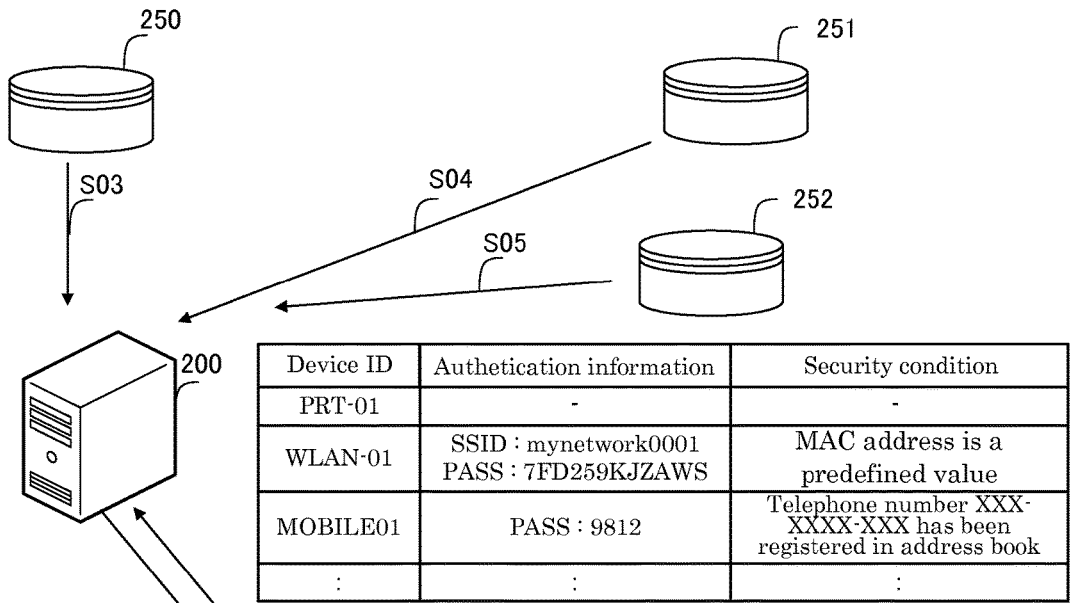
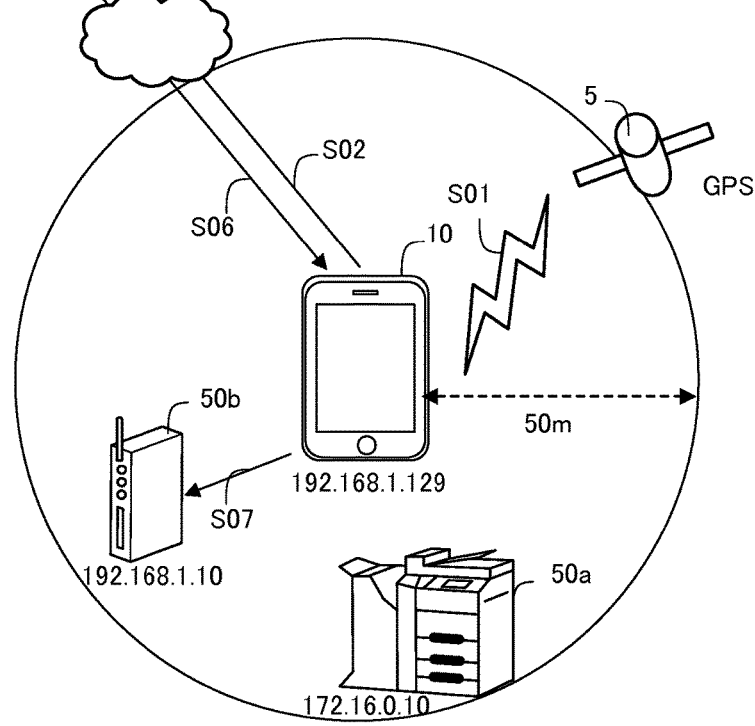

Fig. 6

| Device ID | Location information | IP address |
|---|---|---|
| PRT-01 | 35.681382,139.766084 | 172.16.0.10 |
| WLAN-01 | 35.681525,139.766421 | 192.168.1.10 |
| MOBILE01 | 35.680996,139.767084 | 192.168.1.129 |
| ⋮ | ⋮ | ⋮ |

Fig. 7

| Device ID | Available connection method |
|---|---|
| PRT-01 | Wi-Fi, IPP, LPD, and HTTP(Receive) |
| WLAN-01 | Wi-Fi |
| MOBILE01 | Wi-Fi, Bluetooth, and HTTP(Send) |
| ⋮ | ⋮ |

Fig. 8

| Device ID | Authetication information | Security condition |
|---|---|---|
| PRT-01 | - | - |
| WLAN-01 | SSID : mynetwork0001<br>PASS : 7FD259KJZAWS | MAC address is a predefined value |
| MOBILE01 | PASS : 9812 | Telephone number XXX-XXXX-XXX has been registered in the address book |
| ⋮ | ⋮ | ⋮ |

CONNECTION INFORMATION SHARING SERVER, A METHOD OF SHARING CONNECTION INFORMATION, AND A PROGRAM FOR CONNECTION INFORMATION SHARING SERVER

TECHNICAL FIELD

The present invention relates to a connection information sharing server, a method of sharing connection information, and a program for a connection information sharing server to provide connection information on adjacent devices in response to a request from a communication terminal.

BACKGROUND ART

In recent years, various services have been provided for users by connecting portable terminals with a web server and the like through a public line network. In particular, advanced services, which have been provided for personal computers conventionally, have become possible to provide for mobile phones by the appearance of smartphones (highly functional mobile phones).

Moreover, besides smartphones, various devices previously not connected to the network now supports the network connection and provides an advanced function by exchanging information with other devices in many scenes.

On the other hand, as network structure becomes complicated and a number of terminals connected to network are increased, a problem occurs that a complexity is increased for managing connection information for connecting to each device.

To solve this problem, a terminal management device to manage information on the devices connected to a network is disclosed.

CITATION LIST

Patent Literature

Patent Document 1: JP 2013-69245A

SUMMARY OF INVENTION

According to Patent Document 1, the terminal management device 10 manages devices as described later. The terminal management device 10, in response to being connected with the terminal, acquires terminal identification information and terminal environmental information. The terminal management device 10 associates the acquired information with terminal identification information of the terminal that manages the user agreement of application service in advance, and stores server information which identifies the server of a service provider which is providing the application service. The terminal management device 10 authenticates the terminal based on whether or not the acquired terminal identification information is stored, and if the terminal is properly authenticated, the terminal management device 10 stores the acquired terminal identification information and terminal environmental information. And in response to a transmit request of a terminal environmental information, the terminal management device 10 transmits terminal environmental information based on the server information acquired from the terminal identification information of the terminal which made a transmit request.

The method disclosed in Patent Document 1 has an advantage that even the rights of the terminal can be managed in detail by providing the authentication method for a contract of terminal. But, in consideration of actual usage scenes, there is a problem that a user can't utilize the user's own terminal to enumerate the connectable devices or to acquire the connection information on these devices.

Then, the present inventor focused on the point that security may be maintained and connection information may be managed efficiently by setting security conditions of devices in the server managing the connection information on each device, and by transmitting the authentication information only if a terminal which requested the connection information meets the security condition.

Moreover, in consideration that the number of the candidate terminals becomes too large if only connectable devices are selected from among the devices registered in the server, the present inventor limits the number of devices by selecting the devices only existing within a predefined distance from the requested terminal by focusing on the point that the accessibility may be improved by using the location information on the terminal which requested the connection information. Furthermore, in consideration that a general terminal management system assumes a connection via the Internet, the present inventor also adds a limitation based on the location information by focusing on the point that a distance from the target terminal is important when adhering to other communication standards.

The present invention is to provide a connection information sharing server, a method of sharing connection information, and a program for the connection information sharing server which, in response to a request from a communication terminal, determine adjacent devices based on the location information, determine connection methods to enable the communication terminal to communicate with the adjacent devices, provide the connection methods to the communication terminal, and in case security conditions are set for the adjacent devices, appropriately provide the connection information by transmitting authentication information only if the communication terminal meets the security condition.

According to the first aspect of the present invention, a connection information sharing server, communicatively connected with a communication terminal and provided with a terminal location database storing the location of the devices in a storage unit, includes:

a terminal location acquisition unit acquiring location information on the communication terminal;

an adjacent terminal extracting unit extracting adjacent devices within a predefined distance from the acquired location information from the terminal location database;

a connection method determining unit determining connection methods capable of connecting the communication terminal with the adjacent devices; and a connection information transmitter unit transmitting the determined connection methods together with the information on the adjacent devices to the communication terminal.

According to the first aspect of the present invention, in the connection information sharing server, communicatively connected with a communication terminal and provided with a terminal location database storing the location of the devices in a storage unit; the connection information sharing server acquires location information on the communication terminal, extracts adjacent devices within a predefined distance from the acquired location information from the terminal location database, determines connection methods capable of connecting the communication terminal with the adjacent devices, and transmits the determined connection methods together with the information on the adjacent devices to the communication terminal.

The first aspect of the present invention is the category of device detecting terminal, but the categories of a method for detecting device and a program for device detecting terminal have similar functions and effects.

According to the second aspect of the present invention, the connection information sharing server according to the first aspect of the present invention, further includes:

a connection method database storing connection methods available for the devices; and a connection method extracting unit extracting connection methods available for the communication terminal and the adjacent devices from the terminal information database, wherein the connection method determining unit determines the connection methods capable of connecting the communication terminal with the adjacent devices based on the connection methods available for the communication terminal and for the adjacent devices.

According to the second aspect of the present invention, in the connection information sharing server according to the first aspect of the present invention, the connection information sharing server includes a connection method database storing connection methods available for the devices, and extracts connection methods available for the communication terminal and the adjacent devices from the terminal information database, wherein the connection methods capable of connecting the communication terminal with the adjacent devices are determined based on the connection methods available for the communication terminal and for the adjacent devices.

According to the third aspect of the present invention, the connection information sharing server according to the first or second aspect of the present invention, further includes:

a terminal security database storing the authentication information on the adjacent devices in the storage unit;

an authentication information extracting unit extracting authentication information used for connecting to the adjacent devices from the terminal security database; and an authentication information transmitter unit transmitting the extracted authentication information to the communication terminal.

According to the third aspect of the present invention, in the connection information sharing server according to the first or second aspect of the present invention, the connection information sharing server includes a terminal security database storing the authentication information on the adjacent devices in the storage unit, extracts authentication information used for connecting to the adjacent devices from the terminal security database, and transmits the extracted authentication information to the communication terminal.

According to fourth aspect of the present invention, the connection information sharing server according to the third aspect of the present invention, further including:

a security condition extracting unit extracting security conditions for transmitting the authentication information on the adjacent devices from the terminal security database; the terminal security conditions being stored in the terminal security database as the conditions of the communication terminal capable of transmitting the authentication information, and a security condition judging unit judging whether or not the communication terminal meets the security conditions, wherein the authentication information transmitter unit transmits the authentication information on only the adjacent devices with the security conditions that the communication terminal meets, to the communication terminal.

According to fourth aspect of the present invention, in the connection information sharing server according to the third aspect of the present invention, the connection information sharing server extracts security conditions for transmitting the authentication information on the adjacent devices from the terminal security database; the terminal security conditions is stored in the terminal security database as the conditions of the communication terminal capable of transmitting the authentication information, and judges whether or not the communication terminal meets the security conditions, wherein the authentication information on only the adjacent devices with the security conditions that the communication terminal meets is transmitted to the communication terminal.

According to the fifth aspect of the present invention, a connection information sharing method executed by a connection information sharing serve, communicatively connected with a communication terminal and provided with a terminal location database storing the location of the devices in a storage unit, including the steps of:

acquiring location information on the communication terminal;

extracting adjacent devices within a predefined distance from the acquired location information from the terminal location database;

determining connection methods capable of connecting the communication terminal with the adjacent devices; and transmitting the determined connection methods together with the information on the adjacent devices to the communication terminal.

According to the sixth aspect of the present invention, a program product for use in an connection information sharing server, communicatively connected with the communication terminal and provided with the terminal location database storing the location of devices in the storage unit, includes a non-transitory computer usable medium having a set of instructions physically embodied therein, the set of instructions including computer readable code, which when executed by the connection information sharing server causes the information processing unit to:

acquire location information on the communication terminal;

extract adjacent devices within a predefined distance from the acquired location information from the terminal location database;

determine connection methods capable of connecting the communication terminal with the adjacent devices; and transmit the determined connection methods together with the information on the adjacent devices to the communication terminal.

According to the present invention, a connection information sharing server, a method of sharing connection information, and a program for the connection information sharing server can be provided which, in response to a request from a communication terminal, determine adjacent devices based on the location information, determine connection methods to enable the communication terminal to communicate with the adjacent devices, and provide the connection methods to the communication terminal, and in case security conditions are set for the devices, appropriately provide the connection information by transmitting authentication information only if the communication terminal meets the security condition.

BRIEF DESCRIPTION OF DRAWINGS

FIG. 1 shows the schematic diagram illustrating an overview of a connection information sharing system 1.

FIG. 6 shows an example of a terminal location table in a terminal location database 250.

FIG. 7 shows an example of the connection method table in a connection method database 251.

FIG. 8 shows an example of the terminal security table in a terminal security database 252.

DESCRIPTION OF EMBODIMENTS

Figure 2:
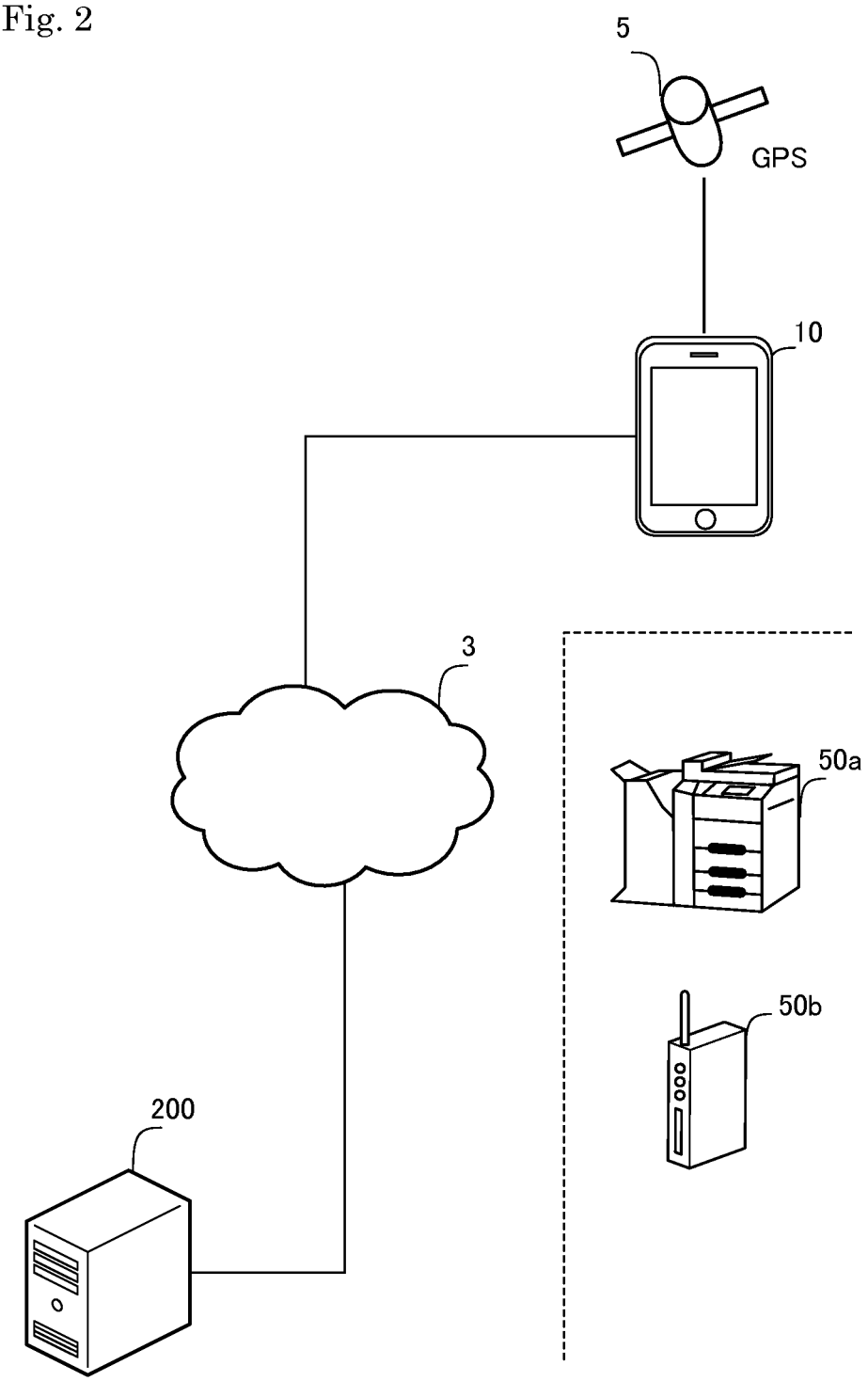
FIG. 2 shows an overall schematic diagram of a connection information sharing system 1.

Hereinafter, embodiments of the present invention will be described with reference to the attached drawings. However, this is illustrative only, and the technological scope of the present invention is not limited thereto.

Outline of a Device Detection System

FIG. 1 is a schematic diagram illustrating an overview of a connection information sharing system 1. With referring to FIG. 1, connection information sharing system 1 is described.

In the connection information sharing system 1, in the beginning a communication terminal 10 acquires current location information on the communication terminal 10 (Step S01). Here, the location information is the information to determine the reference location that is used to detect the adjacent devices. Generally latitude and longitude is acquired by using GPS and Wi-Fi®, but a beacon terminal may be used as a reference location to acquire more detailed location information via the radio communication network.

Next, the communication terminal 10 transmits the acquired location information to a connection information sharing server 200 (Step S02). When the location information is received, the connection information sharing server 200 extracts devices 50 within a predefined distance from the terminal location database 250 (Step S03). Here, the devices 50 within a predefined distance denote devices 50 within a distance expressed by a circle or a rectangle, the center of which is indicated by the received location information. The distance may be determined arbitrarily for the system or for a communication terminal 10.

Moreover, the connection information sharing server 200 refers to the connection method database 251 for the extracted devices 50 to extract the connection methods available for the devices 50 (Step S04). Here, the connection methods available for the communication terminal 10 are extracted at the same time as it is assumed that the information on communication terminal 10 is also stored. From the process described above, it is possible to determine the connection methods capable of connecting the communication terminal with the adjacent devices.

Next, the connection information sharing server 200 refers to the terminal security database 252 for the extracted adjacent devices 50 and extracts the authentication information and the security conditions of the devices (Step S05). Moreover, the information on whether or not communication terminal 10 meets the security condition may be acquired from communication terminal 10.

Then, the connection information sharing server 200 transmits extracted various information to the communication terminal 10 (Step S06). However, for the devices 50 for which the security conditions are set, authentication information may be transmitted only if the terminal 10 meets the security conditions.

Finally, the communication terminal 10 receives information and connects with device 50 using the received information (Step S07). The outline of connection information sharing system 1 has been fully described above. Though private IP address is used as IP address in FIG. 1, global IP address may be used. When private IP address is used, the information that enables to determine network such as SSID may be included. Moreover, using IP address is not mandatory for the constitution of the present invention because many near field communications, excluding Wi-Fi®, are irrelevant to IP address upon connection.

Configuration of Device Detection System

FIG. 2 is a system configuration diagram of the connection information sharing system 1 that is a preferred embodiment of the present invention. The connection information sharing system 1 includes: a public line network 3 (the Internet, the third and the fourth generation communication network, and the like), a GPS 5, a communication terminal 10, a plurality of devices 50, and a connection information sharing server 200.

The communication terminal 10 is an information terminal provided with the functions described later. The communication terminal includes information appliances such as a personal computer, a television, a telephone, a computer, a mobile phone, a handheld terminal, a net book terminal, a slate terminal, an electronic book terminal, a portable music player, an audio component, a content recorder and player, a printer, a facsimile machine, a copy machine, a scanner machine, and an MFP (a multi-function peripheral device or a multi-function printer). The electric appliance also includes white-colored home electric appliances such as a refrigerator, a washing machine, a dishwasher, a fan, an air conditioner, an electric stove, a rice cooker, and a microwave oven. The electric appliance also includes a light, a server, a router, a gateway, a network attached storage (hereinafter referred to as "NAS"), and the like. The communication terminal 10 and each device 50 are connected via LAN. The communication in the connection information sharing system 1 may be wireless or wired communication.

The device 50 is an electronic device for domestic and business use to enable a data communication. Moreover, as the object of the present invention is to provide information to connect the communication terminal 10 with the devices 50, the communication terminal 10 and each device 50 are not communicatively connected at this stage.

The connection information sharing server 200 may be a general server including the following functions.

Functions

Figure 3:
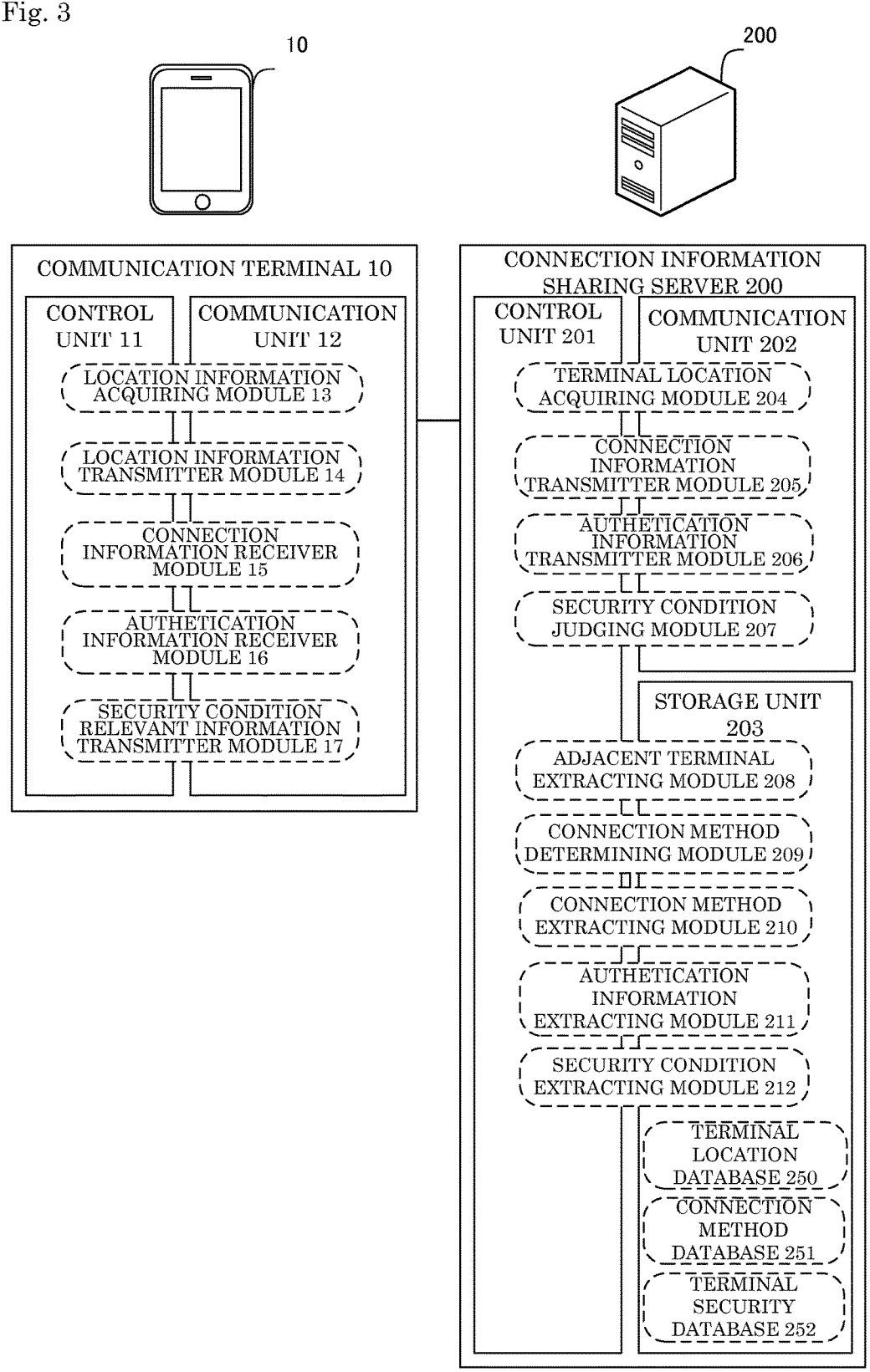
FIG. 3 shows the functional block diagram of a communication terminal 10 and a connection information sharing server 200.

FIG. 3 shows the relations between the functional blocks and each function for the communication terminal 10, the devices 50, and the connection information sharing server 200.

The communication terminal 10 includes a control unit 11 provided with a central processing unit (hereinafter referred to as "CPU"), a random access memory (hereinafter referred to as "RAM"), and a read only memory (hereinafter referred to as "ROM"). The communication terminal 10 also includes a communication unit 12 provided with a Wireless Fidelity or Wi-Fi® enabled device complying with, for example, IEEE802.11 or a wireless device complying with the IMT-2000 standard such as a third or fourth generation mobile communication system, location information acquiring device such as GPS, and a device complying with other radio communication standards.

The control unit 11 reads the predefined program and cooperated with the communication unit 12 to run a location information acquiring module 13, a location information transmitter module 14, a connection method receiver module 15, an authentication information receiver module 16, and a security condition relevant information transmitter module 17.

The connection information sharing server 200 includes a control unit 201 provided with a CPU, a RAM, a ROM, and the like; and a communication unit 202 provided with Wi-Fi® enabled device complying with, for example, IEEE802.11. The connection information sharing server 200 also includes a data storage unit 203 as a memory unit such as a hard disk or a semiconductor memory. The storage unit 203 includes a terminal location database 250, a connection method database 251, and a terminal security database 252.

The control unit 201 of the connection information sharing server 200 reads a predefined program and cooperates with the communication unit 202 to run a terminal location acquiring module 204, a connection information transmitter module 205, an authentication information transmitter module 206, and a security condition judging module 207. Moreover, the control unit 201 of the connection information sharing server 200 reads a predefined program and cooperates with the storage unit 203 to run an adjacent terminal extracting module 208, a connection method determining module 209, a connection method extracting module 210, an authentication information extracting module 211, and a security conditions extracting module 212.

Connection Information Sharing Process

Figure 4:
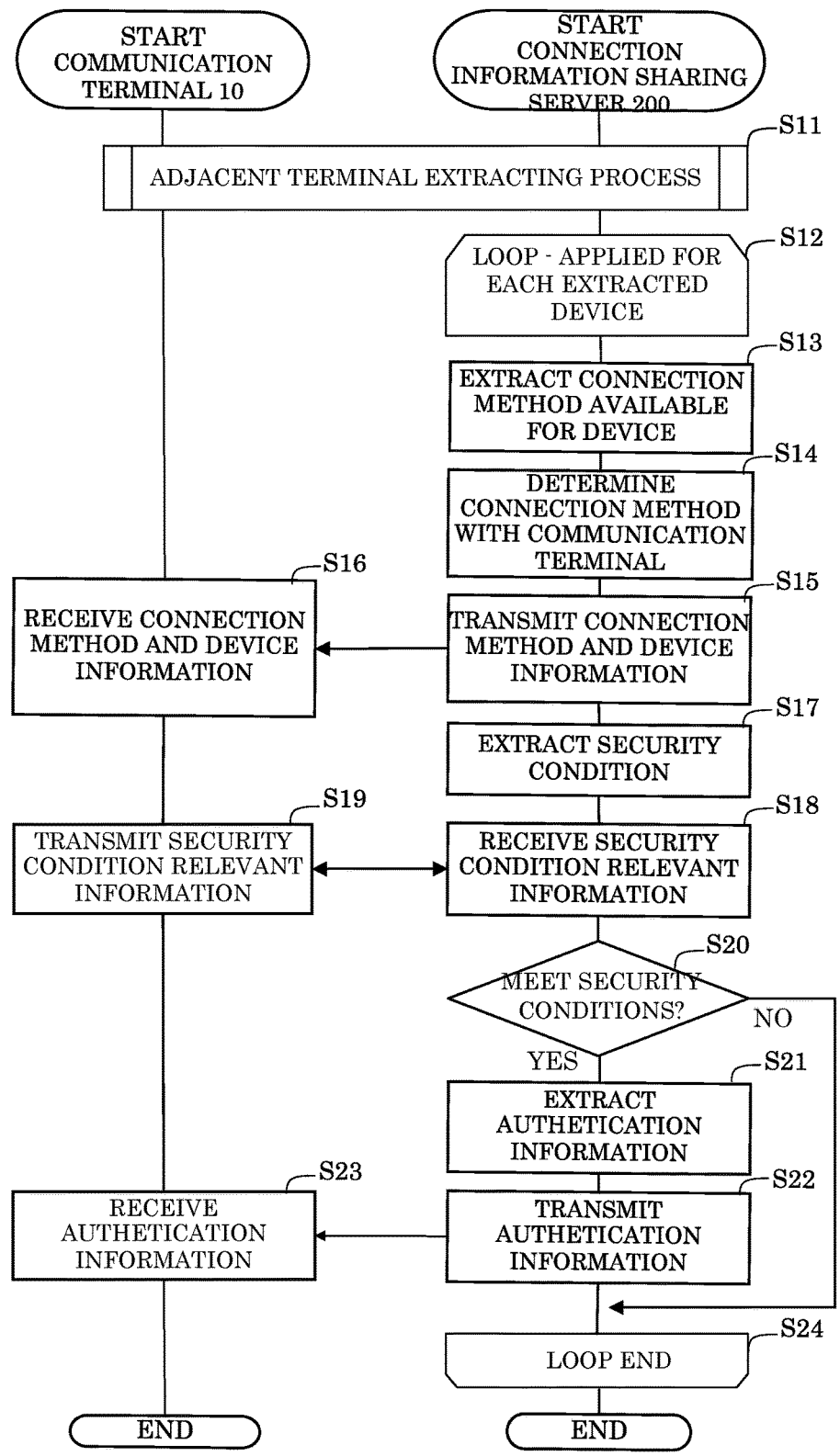
FIG. 4 shows the flow chart of a connection information sharing process executed by a communication terminal 10 and a connection information sharing server 200.

FIG. 4 is a flow chart of the connection information sharing process executed by the communication terminal 10 and the connection information sharing server 200. The process executed by the module of each of the devices will be explained together with the present process.

In the beginning, the communication terminal 10 and the connection information sharing server 200 execute an adjacent terminal extraction process to detect adjacent devices of the communication terminal 10 (Step S11).

Adjacent Terminal Extraction Process

Figure 5:
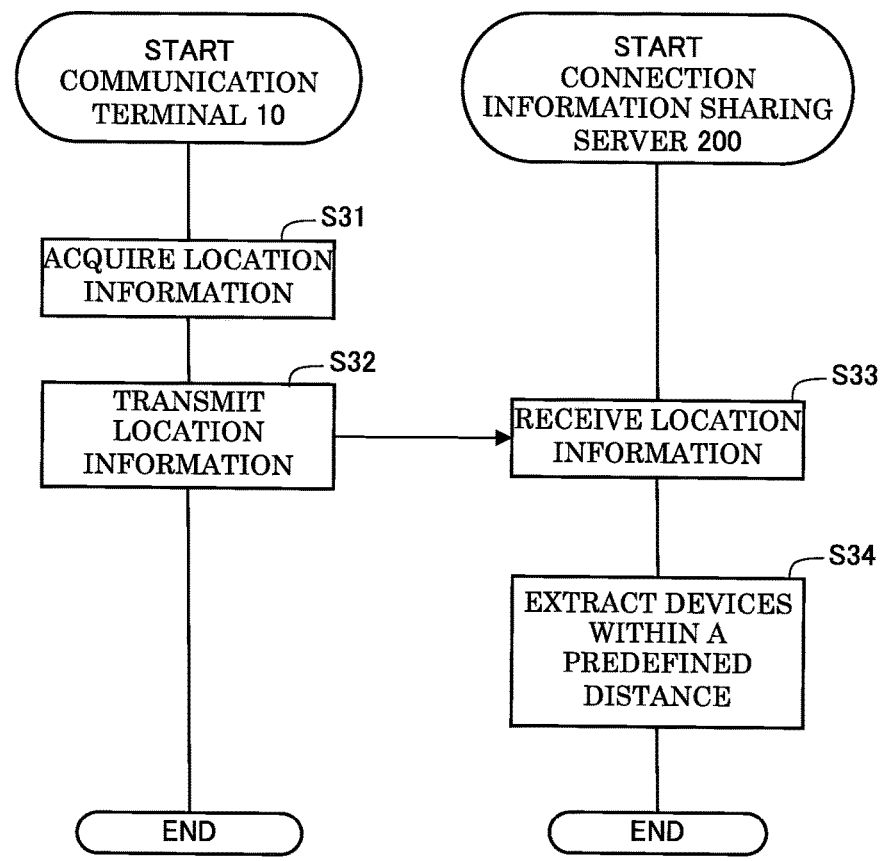
FIG. 5 shows the flow chart of an adjacent terminal extraction process executed by a communication terminal 10 and a connection information sharing server 200.

FIG. 5 is a flow chart of the adjacent terminal extraction process executed by the communication terminal 10 and the connection information sharing server 200. The process executed by the module of each of the devices will be explained together with the present process.

In the beginning, the location information acquiring module 13 of the communication terminal 10 acquires the location information on the current location of communication terminal 10 (Step S31). The location information is the information to determine the reference location that is uses to detect the adjacent devices. Generally latitude and longitude is acquired by using GPS and Wi-Fi®, but a beacon terminal may be used as a reference location to acquire more detailed location information via the radio communication network. Specifically, when power saving near field communication such as BLE (Bluetooth Low Energy) is used, the acquisition of the location information in the accuracy of several meters is possible.

Next, the communication terminal 10 transmits the acquired location information to the connection information sharing server 200 (Step S32). The terminal location acquiring module 204 of the connection information sharing server 200 receives the location information (Step S33).

When the location information is received, the adjacent terminal extracting module 208 extracts devices 50 within a predefined distance from the terminal location database 250 (Step S34). Here, the devices 50 within a predefined distance denote devices within a distance expressed by a circle or a rectangle, the center of which is indicated by the received location information. The distance may be determined arbitrarily for a system or for a communication terminal 10.

FIG. 6 is an example of a terminal locational table in terminal location database 250. In the terminal locational table, device ID, location information, IP address to access the device 50 is stored. Here, the location information is provided as a set of latitude and longitude coordinates, but it is not limited to the coordinates if the location information can be determined uniquely. Moreover, IP address is not necessary for the terminal that doesn't use the Internet connection.

For the extraction of the terminal by adjacent terminal extracting module 208, the conditional expression may be obtained by expressing the extraction distance by a mathematical formula and applying the location information on the received communication terminal 10. The devices 50 within a predefined distance may be extracted by extracting all the registered devices 50 which is associated with the location information matched with the conditional expression.

The adjacent terminal extraction process has been fully described above. Going back to the connection information sharing process, the communication terminal 10 repeatedly executes the steps between S13 and S24 for extracted devices 50 (Step S12).

In the beginning, the connection method extracting module 210 of the connection information sharing server 200 extracts the connection methods available for devices 50 from the connection method database 251 (Step S13).

FIG. 7 is an example of the connection method table in the connection method database 251. In the connection method table, the device ID of each device 50 associated with the available connection methods is stored. Here, device ID in the connection method table and device ID in the terminal location table are corresponding to 1:1. Therefore, the available connection methods of the device 50 may be extracted by extracting the information using the device ID of the current processing device 50.

Then, the connection method determining module 209 of the connection information sharing server 200 determines the connection methods capable of connecting the communication terminal 10 with the device 50 (Step S14). Specifically, the connection methods available for the communication terminal 10 may be extracted from the connection method database 251 to select common connection methods with the device 50. However, depending on the communication standard, the standby mode for transmit and receive might be not common. But in case the communication is limited to either transmitting or receiving, the connection method may be considered to be common if the communication can be supported.

And, the connection information transmitter module 205 of the connection information sharing server 200 transmits extracted various information to the communication terminal 10 (Step S15). Depending on the connection method, necessary information, such as IP address, of the device may be transmitted simultaneously. The connection method receiver module 15 of the communication terminal 10 receives the connection method, etc. (Step S16).

Next, the security condition extracting module 212 of the connection information sharing server 200 extracts the security conditions of the device 50 from the terminal security database 252 (Step S17).

FIG. 8 is an example of the terminal security table in terminal security database 252. In the terminal security table, the device ID, the authentication information, and the reference security conditions to determine whether or not the authentication information may be provided are associated each other for each terminal and stored. Here, device ID in the connection method table, device ID in the terminal location table and device ID in the terminal security table are corresponding to 1:1. Therefore, the security condition and authentication information on the device 50 may be extracted by extracting the information using the device ID of the current processing device 50.

After the security condition is extracted, the security condition judging module 207 of the connection information sharing server 200 requests the communication terminal 10 to transmit the security condition of the communication terminal 10. (Step S18). In response, the security condition relevant information transmitter module 17 of the communication terminal 10 acquires the relevant information from the communication terminal and transmits the acquired information to the connection information sharing server 200 (Step S19).

Here, the relevant information includes data stored in the storage unit including the address book and device specific information such as MAC address, etc. but not limited thereto. Moreover, if the security condition is not set for the device 50, steps S18 and S19 may be omitted.

Next, the security condition extracting module 212 determines whether or not the communication terminal 10 meets the security condition of the device 50 (Step S20) based on the security condition relevant information received from the communication terminal 10. If the communication terminal 10 doesn't meet the security condition of the device 50 (Step S20: in case of "NO"), the authentication information is not shared and a process for the device 50 is completed and the process flow returns to step S13 for the next device 50 (Step S24).

On the other hand, if the communication terminal 10 meets the security condition of the device 50 (Step S20: in case of "YES"), the authentication information extracting module 211 of the connection information sharing server 200 extracts the authentication information on the device 50 from the terminal security database 252 (Step S21), and transmits the authentication information which is extracted by the authentication information transmitter module 206 to the communication terminal 10 (Step S22). The authentication information receiver module 16 of the communication terminal 10 receives the authentication information (Step S23).

The process for the device 50 is completed with the steps described above, and if any device 50 still remains unprocessed, the process flow returns to step S13 for the remaining device 50 (Step S24). When all devices 50 extracted by the adjacent device extracting process is processed, the connection information sharing process is completed.

Through the processes described above, the communication terminal 10 receives the connection methods for connecting with the adjacent devices 50, in addition, if the security conditions are met, the authentication information may be received. As a result, the communication with the devices 50 becomes possible, and the communication with the devices 50 may be started if necessary.

Figure 9:
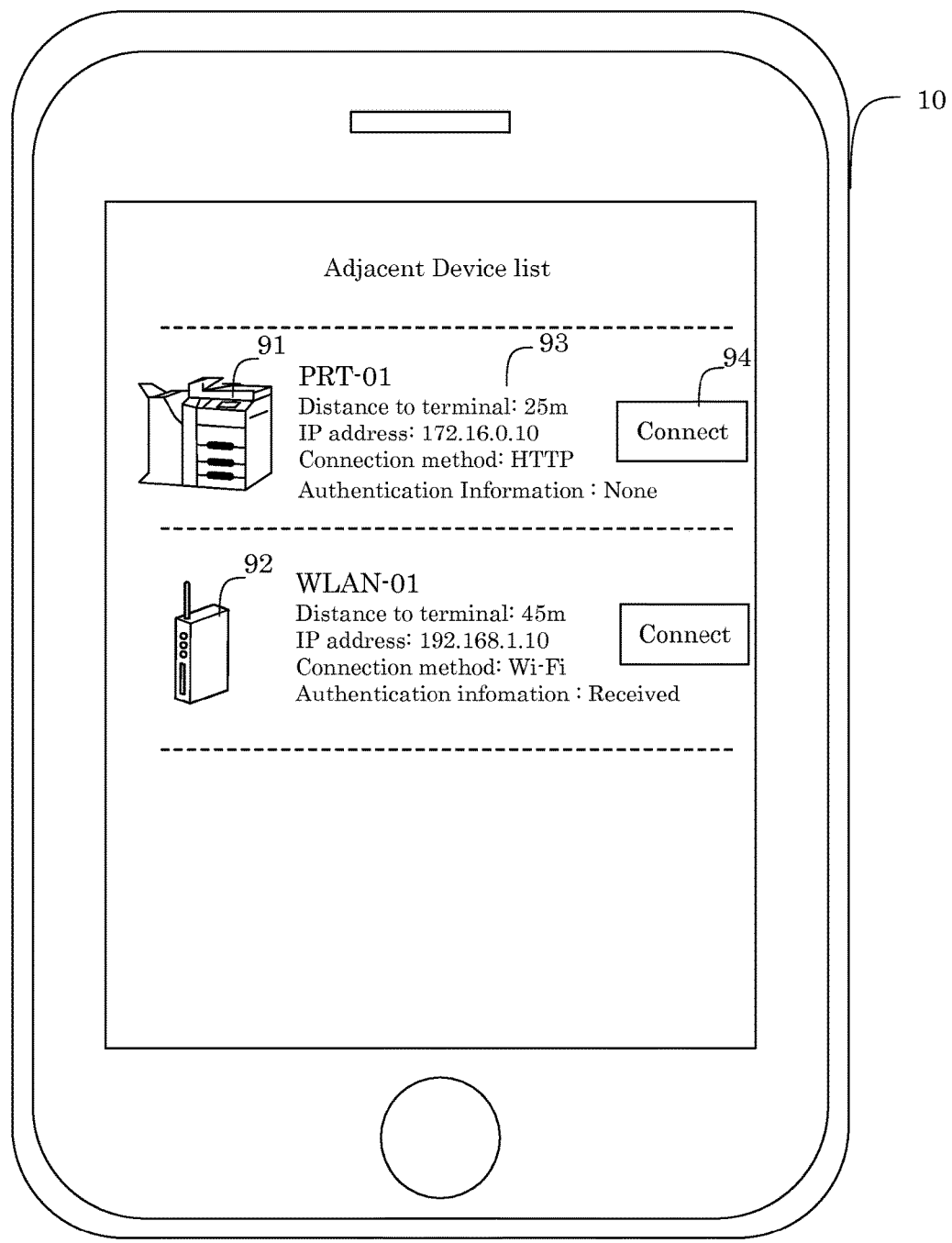
FIG. 9 shows an example of a communication terminal 10 received connection methods and authentication information.

FIG. 9 is an example of communication terminal 10 received connection methods and authentication information. The extracted adjacent devices 50 are shown by the icons 91 and 92 etc., and the information 93 on a device 50 is displayed next to the icons. By pressing down on the connect button 94, a connection to the devices 50 is initiated. Moreover, if a connection method is not determined or the security condition is not met, the connected button 94 may be hidden.

The connection information sharing process has been fully described above.

To achieve the functionality as described above, a computer (including a CPU, an information processing unit, or various terminals) reads and executes a predetermined program. For example, a program is provided in forms recorded in a computer-readable record medium such as a flexible disk, a CD (CD-ROM etc.), and a DVD (a DVD-ROM and a DVD-RAM, etc.). In this case, a computer reads a program from the storage medium, forwards the program to an internal or external memory device to store the program in such a memory device, and executes the program. For example, the application program may be preliminarily recorded in memory (a record media) such as a magnetic disk, an optical disk, and a magnetic optical disk, and then provided from memory to a computer through a communication line.

The embodiments of the present invention are described above, but the present invention is not limited thereto. The embodiment of the present invention is described above. However, the present invention is not limited to the above-mentioned embodiment. The effect described in the embodiment of the present invention is only the most preferable effect produced from the present invention. The effect of the present invention is not limited to those described in the embodiment of the present invention.

REFERENCE SIGNS LIST 1 connection information sharing system
3 public network
5 GPS
10 communication terminal
50 device
200 connection information sharing server
250 terminal location database
251 connection method database
252 terminal security database

What is claimed is:

1. A connection information sharing server, communicatively connected with a communication terminal and provided with a terminal location database storing the location of the devices in a storage unit, comprising: memory for storing instructions to execute the following: a terminal location acquisition process acquiring location information on the communication terminal; an adjacent terminal extracting process extracting adjacent devices within a predefined distance from the acquired location information from the terminal location database; a connection method determining process determining connection methods capable of connecting the communication terminal with the adjacent devices; a connection information transmitter process transmitting the determined connection methods together with the information on the adjacent devices to the communication terminal; an authentication information extracting process extracting authentication information used for connecting to the adjacent devices from the terminal security database; an authentication information transmitter unit transmitting the extracted authentication information to the communication terminal; and a terminal security database storing the authentication information on the adjacent devices in the storage unit.

2. The connection information sharing server according to claim 1, further comprising: a connection method database that stores connection methods available for the devices in the storage unit; and a connection method extracting process that is executed by the controller by cooperating with the storage unit and extracts connection methods available for the communication terminal and the adjacent devices from the connection method database, wherein the connection method determining process determines the connection methods capable of connecting the communication terminal with the adjacent devices based on the connection methods available for the communication terminal and for the adjacent devices.

3. The connection information sharing server according to claim 1, further comprising: a security condition extracting process that is executed by the controller by cooperating with the storage unit and extracts security conditions for transmitting the authentication information on the adjacent devices from the terminal security database; the terminal security conditions being stored in the terminal security database as the conditions of the communication terminal capable of transmitting the authentication information; and a security condition judging process that is executed by the controller by cooperating with the communication process-and judges whether or not the communication terminal meets the security conditions, wherein the authentication information transmitter unit transmits the authentication information on only the adjacent devices with the security conditions that the communication terminal meets, to the communication terminal.

4. An connection information sharing method executed by a connection information sharing server, communicatively connected with a communication terminal and provided with a terminal location database storing the location of the devices in a storage unit and a terminal security database storing the authentication information on the adjacent devices in the storage unit, comprising: Memory for storing instructions to execute the following: acquiring location information on the communication terminal; extracting adjacent devices within a predefined distance from the acquired location information from the terminal location database; determining connection methods capable of connecting the communication terminal with the adjacent devices; extracting authentication information used for connecting to the adjacent devices from the terminal security database; and transmitting the determined connection methods and the extracted authentication information together with the information on the adjacent devices to the communication terminal.

5. A program product for use in a connection information sharing server, communicatively connected with communication terminal and provided with a terminal location database storing the location of a terminal in a storage unit and a terminal security database storing the authentication information on the adjacent devices in the storage unit, comprising a non-transitory computer usable medium having a set of instructions physically embodied therein, the set of instructions including computer readable code, which when executed by the affiliate server causes the information processing unit to: acquire location information on the communication terminal; extract adjacent devices within a predefined distance from the acquired location information from the terminal location database; determine connection methods capable of connecting the communication terminal with the adjacent devices; extract authentication information used for connecting to the adjacent devices from the terminal security database; and transmit the determined connection methods and the extracted authentication information together with the information on the adjacent devices to the communication terminal.

6. The connection information sharing server according to claim 1, further comprising: a connection method database that stores connection methods available for the devices in the storage unit; and a connection method extracting process-that is executed by the controller by cooperating with the storage unit and extracts connection methods available for the communication terminal and the adjacent devices from the connection method database, wherein the connection method determining process determines a common connection method between the connection methods available for the communication terminal and the connection methods available for each of the adjacent devices as the connection methods capable of connecting the communication terminal with a corresponding one of the adjacent devices.

7. The connection information sharing method according to claim 4, wherein the connection information sharing server further includes a connection method database storing connection methods available for the devices, wherein the connection information sharing method further comprises: extracting connection methods available for the communication terminal and the adjacent devices from the connection method database; and determining a common connection method between the connection methods available for the communication terminal and the connection methods available for each of the adjacent devices as the connection methods capable of connecting the communication terminal with a corresponding one of the adjacent devices.

8. The connection information sharing method according to claim 4, further comprising: extracting security conditions for transmitting the authentication information on the adjacent devices from the terminal security database, the terminal security conditions being stored in the terminal security database as the conditions of the communication terminal capable of transmitting the authentication information; and judging whether or not the communication terminal meets the security conditions, wherein the authentication information on only the adjacent devices with the security conditions that the communication terminal meets is transmitted to the communication terminal.

9. The program according to claim 5, wherein the connection information sharing server further includes a connection method database storing connection methods available for the devices, wherein the set of instructions causes the information processing unit further to: extract connection methods available for the communication terminal and the adjacent devices from the connection method database; and determine a common connection method between the connection methods available for the communication terminal and the connection methods available for each of the adjacent devices as the connection methods capable of connecting the communication terminal with a corresponding one of the adjacent devices.

10. The program according to claim 5, wherein the set of instructions causes the information processing unit further to: extract security conditions for transmitting the authentication information on the adjacent devices from the terminal security database, the terminal security conditions being stored in the terminal security database as the conditions of the communication terminal capable of transmitting the authentication information; and judge whether or not the communication terminal meets the security conditions, wherein the authentication information on only the adjacent devices with the security conditions that the communication terminal meets is transmitted to the communication terminal.

* * * * *